United States Patent [19]

Petruchik

[11] Patent Number: 5,574,524
[45] Date of Patent: Nov. 12, 1996

[54] SINGLE USE CAMERA AUTO WIND MOTOR CONTROL MECHANISM

[75] Inventor: Dwight J. Petruchik, Honeoye Falls, N.Y.

[73] Assignee: Eastman Kodak Company, Rochester, N.Y.

[21] Appl. No.: 465,038

[22] Filed: Jun. 5, 1995

[51] Int. Cl.$^6$ ............................ G03B 1/12; G03B 17/38
[52] U.S. Cl. .................................... 396/411; 396/502
[58] Field of Search .................................. 354/173.1, 213, 354/212, 266

[56] References Cited

U.S. PATENT DOCUMENTS

| 4,060,818 | 11/1977 | Furuta | 354/266 |
| 4,428,657 | 1/1984 | Tezuka | 354/173.1 |
| 5,166,715 | 11/1992 | Labaziewicz | 354/173.1 |

Primary Examiner—A. A. Mathews
Attorney, Agent, or Firm—Roger A. Fields

[57] ABSTRACT

An auto wind motor control mechanism for a camera is provided which includes a user actuatable shutter release button (26) and a control switch (16) which upon closure thereof, activates a film advance motor (14) for advancing film disposed within the camera. A high energy lever (54) is provided which in response to movement of the shutter release button (26), sequentially actuates the switch (16) after actuating the shutter (24). A cam (36) serves to open the control switch (16) after the film has advanced a predetermined distance. The shutter release button (26) engages the lever (54) with first and second hooks (78 and 76). The lever (54) is released from the first hook (78) upon movement of the shutter release button (26) from its ready position towards its release position, whereby the shutter (24) is actuated. The lever (54) is then engaged by the second hook (76) until release of the button (26) by the user, whereby the lever (54) is released from the second hook (76) and the switch (16) is closed.

21 Claims, 4 Drawing Sheets 5,574,524

SINGLE USE CAMERA AUTO WIND MOTOR CONTROL MECHANISM

DESCRIPTION

1. Field of the Invention

This invention relates to single use cameras and more particularly to single use cameras which incorporate an electronic motor auto wind film advance mechanism.

2. Background of the Invention

Auto wind film advance mechanisms are very common in Non-Single Lens Reflex (NSLR) cameras, commonly known as "point and shoot" type cameras. These cameras usually have sophisticated electronic circuits or complex switching circuits to control the sequencing of the electronic motor.

Recently, however, single use cameras have become increasingly popular. Single use cameras are relatively simple, inexpensive units which are factory sealed with a single roll of film loaded therein. A user simply takes photographs until the roll of film has been exhausted, and then sends the camera back to the manufacturer or to a processor who processes the film and discards or recycles the camera. This type of camera appeals to users who desire an easy-to-operate camera or to those who are on vacation and who may have forgotten their own cameras. These cameras may also appeal to those who wish to take photographs in environments that they fear may damage their own more expensive cameras, such as corrosive salt air or wet locales. Single use cameras are even available in water-tight enclosures to permit underwater photography.

A difficulty associated with single use cameras is that consumers are generally unwilling to pay high prices for a camera that is essentially thrown away after shooting only one roll of film. Accordingly, manufacturing costs must be kept very low. Unfortunately, this cost constraint makes the inclusion of additional features, such as conventional auto wind mechanisms, prohibitively expensive for use in single use cameras.

Accordingly, it is desirable to have an auto wind film advance mechanism which is sufficiently simple and inexpensive to manufacture, to enable its use in a single use camera.

SUMMARY OF THE INVENTION

It is the principal object of this invention to provide an improved single use camera.

It is an additional object of this invention to provide an auto wind film advance mechanism of simplified and compact construction.

A further object of this invention is to provide an auto wind film advance mechanism that is relatively inexpensive to manufacture while being reliable in operation.

According to this invention, an auto wind motor control mechanism for a camera is provided which includes a user actuatable shutter release button and a control switch which upon closure thereof, activates a film advance motor for advancing film disposed within the camera. A high energy lever is provided which, in response to movement of the shutter release button, actuates both a shutter and the switch. A cam serves to open the control switch after the film has advanced a predetermined distance.

A primary advantage of the invention is that by using the same lever to both actuate the shutter and close the control switch, an auto wind film advance mechanism is provided which employs simple, low cost mechanical technology, rather than sophisticated electronic circuitry or other complex control systems.

The above and other objects and advantages of this invention will be more readily apparent from a reading of the following description of an exemplary embodiment thereof taken in conjunction with the following drawing.

DETAILED DESCRIPTION OF THE PREFERRED EMBODIMENT

Figure 1:
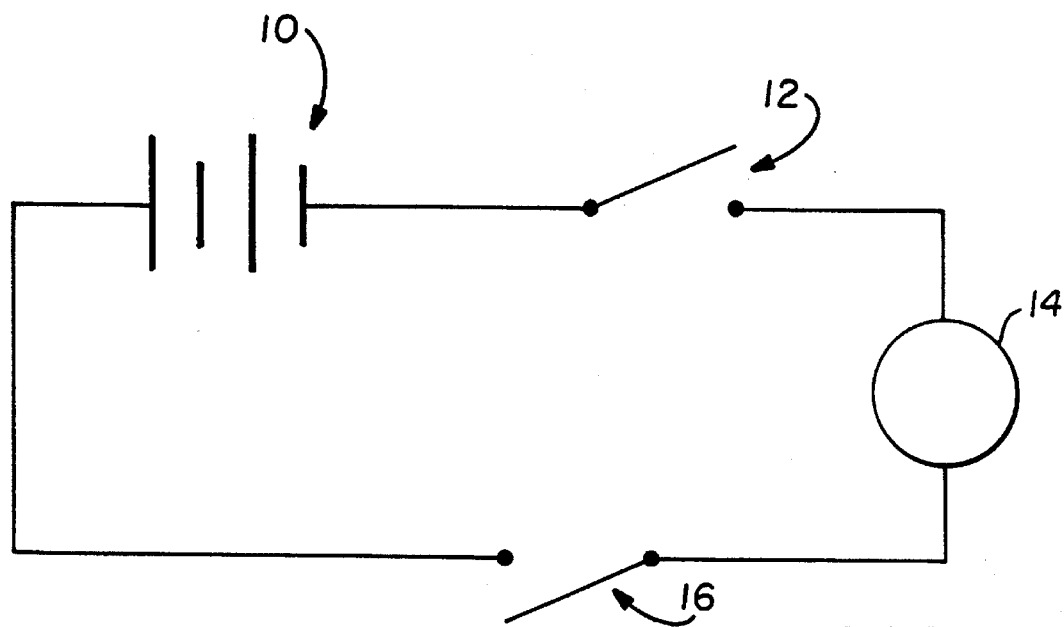
FIG. 1 is a schematic representation of an electrical control circuit for the auto wind film advance mechanism of the present invention.

Referring to FIG. 1, an electrical control circuit for the auto wind film advance mechanism of the present invention comprises a battery 10, a user operated camera on/off switch 12, an electronic motor 14 and a "normally open" film sequence control switch 16. As is readily apparent, the motor 14 will be energized only upon closure of both the on/off switch 12 and the film sequence control switch 16.

Figure 2:
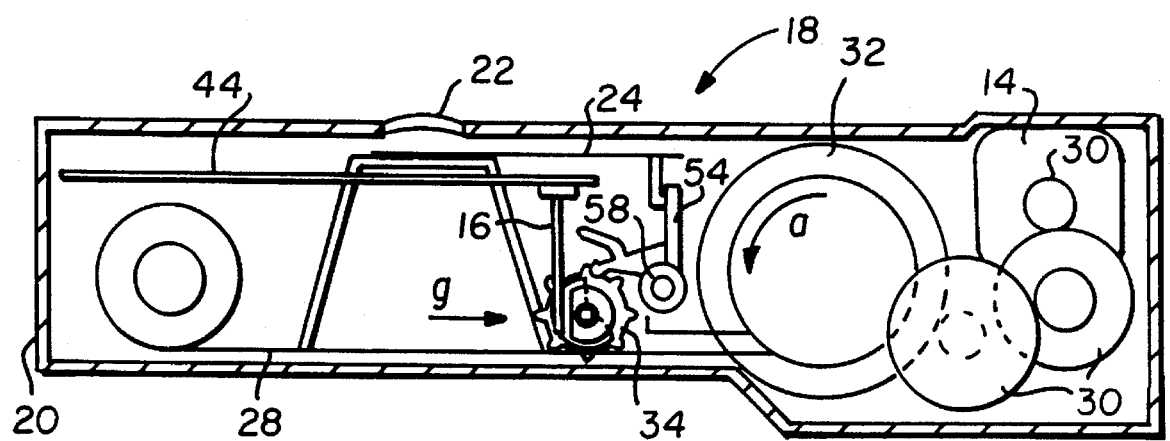
FIG. 2 is a partially sectioned, schematic top view of a single use camera incorporating the auto wind film advance mechanism of the present invention.
Figure 7:
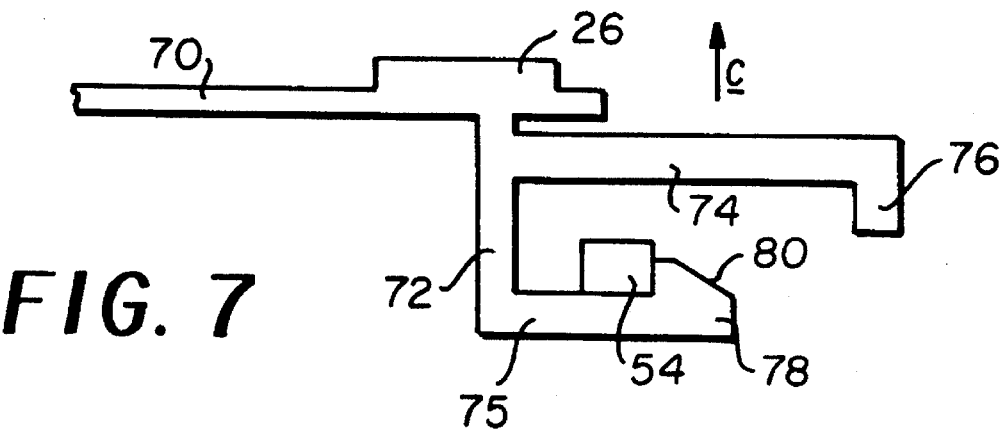
FIGS. 7–9 are schematic front views of components of the auto wind film advance mechanism of the present invention, during various steps in the operation thereof.
Figure 8:
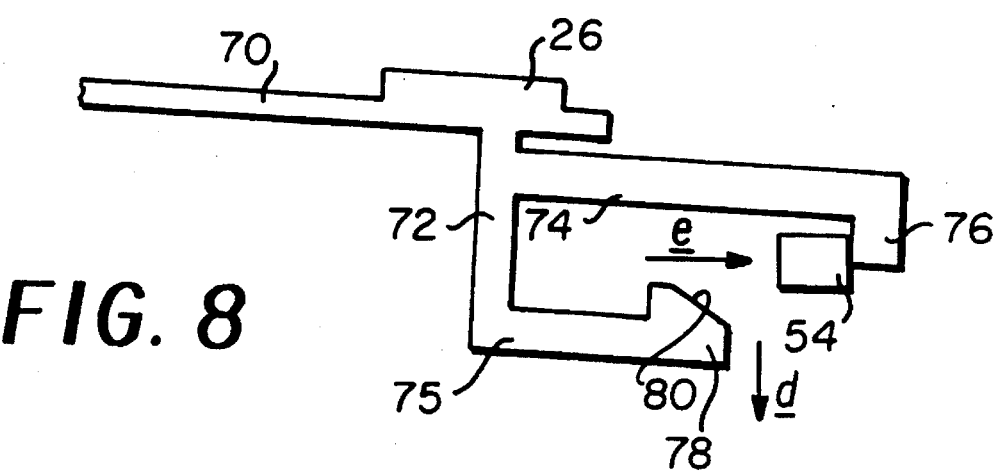
Figure 9:
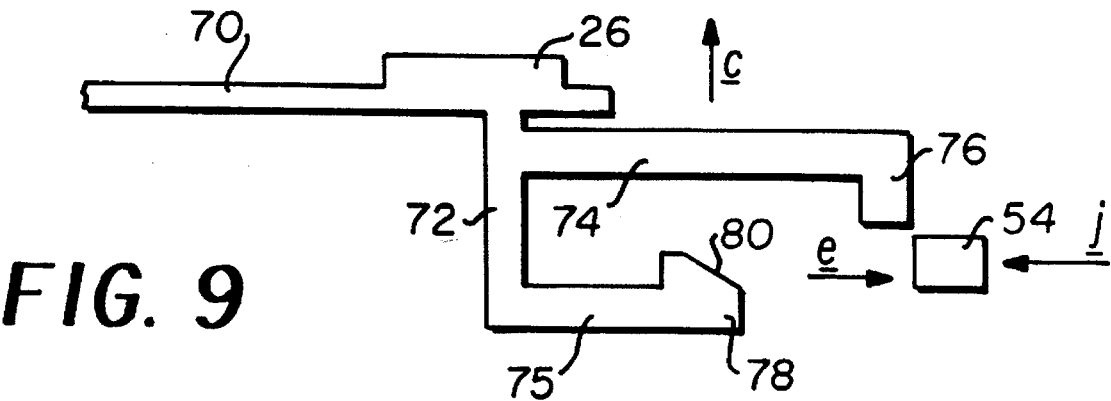

As shown in FIG. 2, a camera 18 includes a housing 20, lens 22, a shutter 24 and a shutter release button 26 (FIGS. 7–9). Upon activation thereof by the user, the shutter release button 26 actuates the shutter 24 in a manner familiar to one skilled in the art, to create a photographic image on a frame of the film 28.

As also shown in FIG. 2, the motor 14 is engaged with drive gears 30 which in turn engage an advance wheel 32. The advance wheel 32 has circumferentially spaced teeth (not shown) which serve to engage a series of spaced perforations disposed along edges (also not shown) of the film 28 in a manner familiar to those skilled in the art. A film sprocket 34 is rotatably disposed about axle 35 to engage the film perforations. Upon energization of the motor, the advance wheel 32 will rotate in the direction indicated by arrow a to wind the film thereabout and thereby advance the film. This movement of the film will in turn, rotate the sprocket 34 about axle 35. This movement will be discussed in greater detail hereinafter with respect to the operation of the present invention.

As best shown in FIGS. 3–6, the film sprocket 34 has a film sequence cam 36 and a high energy cam 38 disposed co-axially therewith to rotate with the sprocket. In a preferred embodiment, the sprocket 34 is disposed at a lower position on the axle 35, with the high energy cam 38 spaced thereabove and the film sequence cam 36 disposed above the high energy cam 38 at an upper position.

The film sequence cam 36 includes a generally semi-cylindrical cam surface 40 which is engageable with a cam follower arm 42 of the control switch 16. Cam 36 also includes a non-engaging flat 46 which serves to selectively disengage the cam 36 from the cam follower 42, as will be discussed in greater detail hereinafter.

Figure 3:
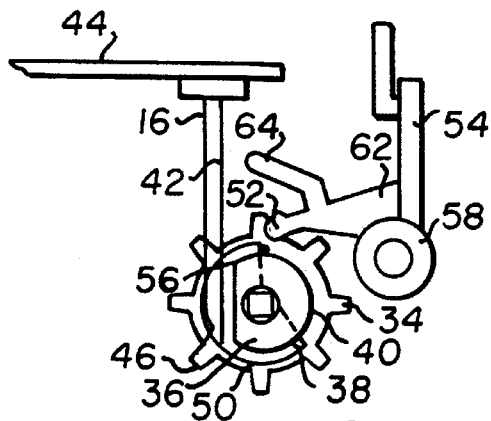
FIGS. 3–6 are views similar to that of FIG. 2, on an enlarged scale, of several components of the autowind film advance mechanism of the present invention, during various steps in the operation thereof.
Figure 4:
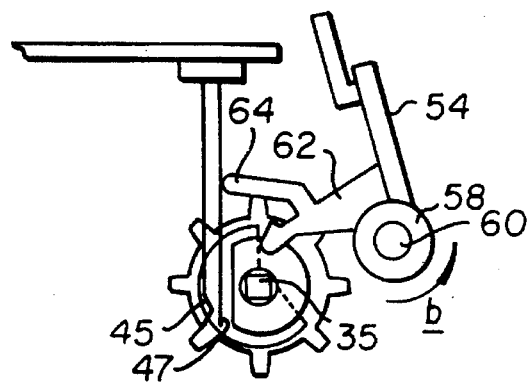
Figure 5:
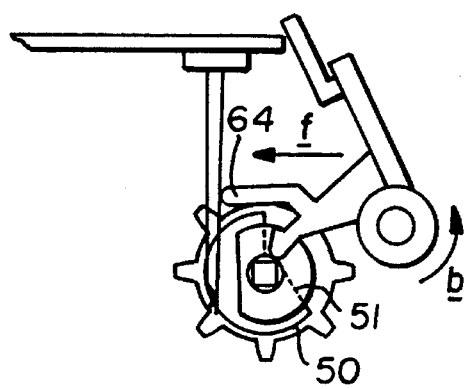
Figure 6:
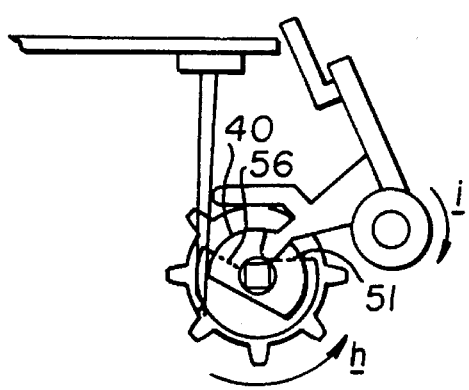

As best shown in FIGS. 3–6, the film sequence control switch 16 is disposed on a circuit board 44 disposed within the camera housing 20. The switch includes the cam follower arm 42 mentioned hereinabove, which is pivotable in response to actuation by film sequence cam 36. When actuated, the arm 42 will pivot against its bias to close the normally open contacts 45 and 47 as shown in FIGS. 5 & 6.

The high energy cam 38 includes a generally semi-cylindrical cam surface 50 and a curvilinear surface 51, for selectively engaging a cam follower nose 52 of a high energy lever 54. A flat 56 serves to disengage the cam 38 from the follower nose 52 as will be discussed in greater detail hereinafter with respect to the operation of the present invention.

The high energy lever 54 depends from a hub 58 which is rotatably disposed about pivot pin 60. The lever 54 further includes a limb 62 which, preferably, depends generally orthogonally therefrom, adjacent the hub 58. The nose 52 is disposed at an outer end of the limb 62 and as also shown in FIGS. 2–6, a finger 64 extends from a mid-point of the limb 62 for selectively engaging arm 42 of the control switch 16. The lever 54 is resiliently biased by a spring or similar device (not shown) in the direction indicated by arrow h in FIGS. 4 and 5.

Figure 10:
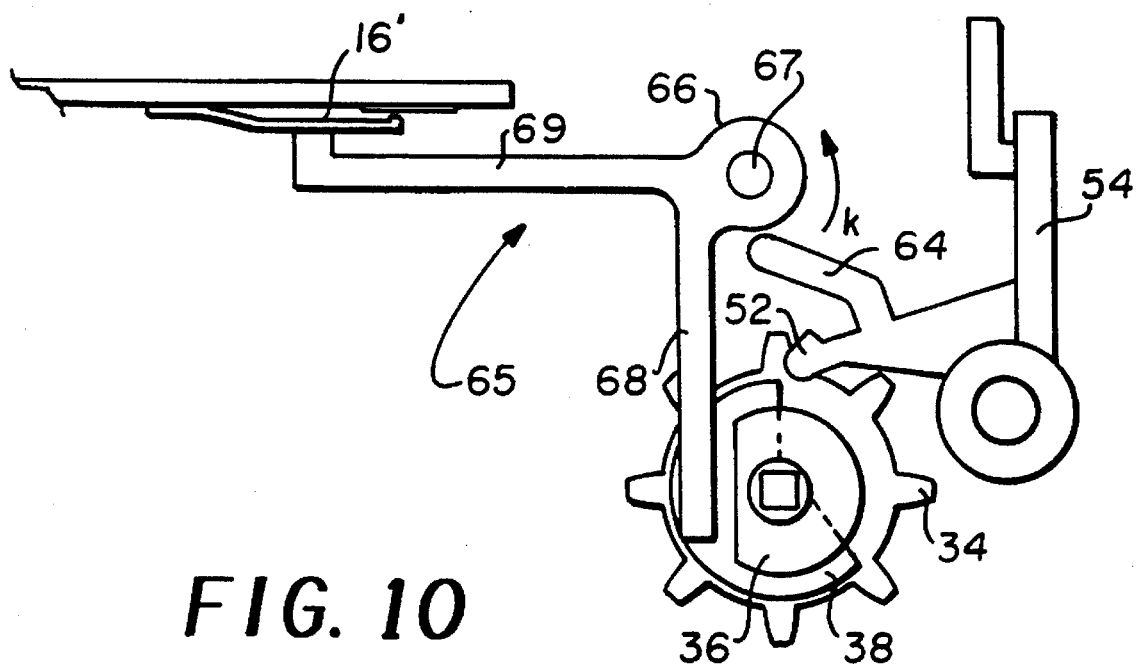
FIG. 10 is a schematic top view of several components of an alternate embodiment of the auto wind film advance mechanism of the present invention.

Referring now to FIG. 10, rather than directly engaging the film sequence control switch 16, the high energy lever 54 and the film sequence cam 36 alternatively engage a switch control lever 65, which in turn engages a remote "normally open" film sequence control switch 16'. The lever 65 comprises a hub 66 which is pivotably disposed about a pivot pin 67 and from which depend a pair of divergently disposed legs 68 and 69. As shown, the legs are preferably disposed orthogonally from one another and the lever 65 is biased in the direction indicated by arrow k.

In particular, the leg 68 is disposed to be pivotably engaged by cam follower nose 52 and finger 64 of the high energy lever 54, as well as by the film sequence cam 36. Leg 69 is disposed to engage the remote film sequence control switch 16' in response to the movement of leg 68, as will be discussed hereinafter with respect to the operation of the present invention.

Referring now to FIGS. 7–9, the shutter release button 26 is disposed at one end of an arm 70. The arm 70 is disposed at its other end (not shown) on the housing 20 of the camera 18 in a manner which serves to bias the button 26 in a generally upwards direction (arrow c) to a "ready" position as shown in FIG. 7, while permitting a user to depress the button in a generally opposite, downward direction against the bias to a "release" position as shown in FIG. 8. For ease of description, when used throughout the instant application, the term upward will refer to the direction of arrow c while the term downward will refer to the direction opposite that of arrow c. The particular means by which the arm 70 is so disposed onto the housing 20 is not shown as it may comprise any number of means which would be familiar to one skilled in the art. However, by way of example, such means could include hingedly connecting the far end of the arm 70 to the housing 20 and utilizing a discrete spring device, such as a coil spring disposed between the arm 70 and housing 20, to exert the required upward bias. A further, and perhaps preferable embodiment however, may simply comprise fabricating the arm 70 from a resilient polymeric material and rigidly disposing its far end to the housing 20, whereby the resiliency of the arm 70 would permit the button 26 to be depressed downwardly by the user and whereby the arm's natural bias would return the button to its upward "ready" position upon release.

As also shown in FIGS. 7–9, the release button 26 includes a leg 72 which depends downwardly therefrom, and upper and lower feet 74 and 75, respectively, which depend generally orthogonally from the leg. The upper foot 74 extends a predetermined distance from the leg 72 in a direction generally parallel to the arm 70 and terminates in an upper hook 76 which depends downwardly therefrom in a direction generally parallel to the direction of motion of the button. The lower foot 75 extends in a direction generally parallel to the upper foot 74 for a predetermined distance from the leg which is substantially less than the predetermined distance of the upper foot 74. The foot 75 terminates in a lower hook 78 which depends upwardly therefrom in a direction generally parallel to the direction of motion of the button 26. The lower hook 78 further comprises a leading cam follower surface 80 disposed thereon which is engageable by lever 54 to displace the foot downwardly in the direction d (FIG. 8) as will be discussed hereinafter. Both upper and lower hooks 76 and 78 are engageable with the high energy lever 54 as shown in FIGS. 7 & 8 and as will also be discussed hereinafter.

The preferred embodiment of the invention having been fully described, the following is a description of the operation thereof.

Referring to FIGS. 2 and 3, the camera is ready to take a photograph, with the camera on/off switch 12 disposed in the "ON" position. As shown in FIGS. 3 and 7, the shutter release button 26 is in its uppermost "ready" position and the high energy lever 54 is retained by the lower hook 78 in its fully charged initial or "cocked" position (FIG. 7), against the bias of the spring (not shown) or similar biasing means associated with the lever. The flat 46 of the film sequence cam 36 is disposed proximate the cam follower arm 42 of the film sequence control switch 44. Being so disposed, the contacts 45 and 47 of switch 44 are open and the motor 14 is therefore off or inactive.

The user then depresses the shutter release button 26 to move it to its "release" position, whereby the hook 78 is displaced in the downward direction d as shown in FIG. 8, to disengage the lever 54. Once disengaged, the lever is biased about pivot pin 60 in the direction b (FIG. 4) and direction e (FIG. 8), to thereby actuate the shutter 24 and take a photograph as mentioned hereinabove. The lever will continue to pivot until it engages and is retained by the upper hook 76 as shown in FIG. 8. As shown in FIG. 4, the contacts 45 and 47 of the switch 16 remain open during this step in the operation and thus, the motor 14 remains inactive.

Referring now to FIG. 9, as the user disengages or releases the shutter release button 26, the button will be biased upwards in the direction of arrow c towards its "ready" position. This movement will serve to displace the upper hook 76 in an upwards direction to disengage the lever 54. The lever will thus continue to be biased in the direction e (FIG. 9) and direction b (FIG. 5) until it reaches its final or full travel position as shown in FIG. 5. Referring now to FIG. 5, in this full travel position, the finger 64 of the lever 54 will have engaged the cam follower arm 42 of the film sequence control switch 16 and pivoted the arm 42 in the direction of arrow f to close the contacts 45 and 47. At this point, the electric circuit is closed and the motor 14 is activated.

As shown in FIG. 2, this motor activation will in turn, actuate the drive gears 30 to rotate the advance wheel 32 in direction a. As mentioned hereinabove, this rotation will wind the film 28 about the wheel 32 to advance the film 28 in the direction indicated by arrow g. This advance movement will thereby rotate the film sprocket 34, film sequence cam 36 and high energy cam 38 in direction h (FIG. 6).

As the cams rotate, the cam surface 40 of sequence cam 36 will engage the follower arm 42 of the sequence control switch 16 to keep the contacts 45 and 47 thereof, closed, as shown in FIG. 6. As also shown in FIG. 6, once the cam surface 40 has so engaged the arm 42, the cam surface 51 of the high energy cam 38 engages the nose 52 to begin to rotate the high energy lever in the direction indicated by arrow i (FIG. 6) and direction i (FIG. 9) against the bias of the lever spring (not shown) towards the lever's initial or cocked position (FIG. 3). As the lever 54 so moves, it will engage cam surface 80 of the lower hook 78 to displace the hook and button 26 in the downward direction d (FIG. 8) against its bias, until lever 54 clears hook 78, whereby the upward bias of the button 26 will return it (in direction c) to its ready position as shown in FIG. 7. Once the lever has so cleared the hook, the continued rotation of the cam 36 will move the semi-cylindrical cam surface 50 into engagement with the nose 52, whereby further rotation of the cam 38 will not nominally result in further rotational movement of the lever 54.

The sprocket 34 and cams will continue to rotate until one full rotation thereof (preferably 8 film perforations) is complete and they are returned to their initial positions as shown in FIG. 3. Upon such completion, the flat 46 of cam 36 will have returned to its position proximate the follower arm 42 of the film sequence control switch 16 whereby the normally open bias of the arm 42 will have opened the contacts 45 and 47, thereby stopping the motor 14. Furthermore, the cam surface 50 of high energy cam 38 will have released nose 52 of the high energy lever 54, whereby the lever will be retained in its initial or cocked position by hook 78 as shown in FIG. 6. The camera 18 has thus completed one cycle and is ready to take another photograph.

The operation of the alternative embodiment of FIG. 10 is substantially the same as the above described operation, with the exception that the cams 36 and 38, and the lever 54, engage leg 68 of the switch control lever 65, rather than arm 42 of the switch 16. That engagement serves to pivot the lever 65 against the lever's bias (in the direction opposite that indicated by arrow k), whereby the leg 69 closes the film sequence control switch 16'. Upon completion of a full rotation of the cams 36 and 38, the lever 65 is biased in the direction k, whereby the switch 16' is opened to stop the motor 14.

This switch mechanism of the present invention therefore serves to delay activation of the motor until the shutter release button is released by the user. Thus, advantageously, the proper sequencing of the motor for the auto wind film advance is maintained, while utilizing the high energy lever to close the contacts of the film sequence control switch. The delicate sequencing of the motor is therefore accomplished in a relatively simple manner which nominally eliminates the need for the complex mechanisms, switches, timers or other relatively costly control components of the prior art.

Among the further advantages of the switch mechanism of this invention is the use of components which can be fabricated and assembled inexpensively, thereby making the mechanism ideally suited to application in single use cameras.

An advantage of the alternate embodiment of FIG. 10 is that it allows greater flexibility in the placement of components within the camera housing 20. In particular, the remote switch 16' and the circuit board 44 on which it is disposed, may be disposed in a more convenient location within the camera 18, simply by varying the length of legs 68 and 69, and/or the relative angle at which the legs depend from the hub 66. This embodiment may therefore further simplify and thereby reduce the cost of manufacture of the auto wind motor control switch and mechanism.

Although the present invention has been described with respect to various preferred geometries, it should be recognized by one skilled in the art that any construction which provides for a lever to both actuate a shutter and close a switch to activate a film advance motor, should be construed to be within the scope of the invention.

Furthermore, although the present invention has been described with respect to cams disposed in conjunction with a film sprocket, it should be recognized by one skilled in the art that such cams could be provided at any location in the camera, including being disposed on the advance wheel, or in conjunction with the motor or drive gears, and still remain within the scope of the present invention.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

| PARTS LIST FOR FIGS. 1–10 |
| --- |
| 10 Battery |
| 12 Camera ON/OFF Switch |
| 14 Motor |
| 16 Control Switch |
| 18 Camera |
| 20 Housing |
| 22 Lens |
| 24 Shutter |
| 26 Shutter Release Button |
| 28 Film |
| 30 Drive Gears |
| 32 Advance Wheel |
| 34 Film Sprocket |
| 35 Axle |
| 36 Film Sequence Cam |
| 38 High Energy Cam |
| 40 Cam surface |
| 42 Cam follower arm |
| 44 Circuit Board |
| 45 Contacts |
| 47 Contacts |
| 46 Flat |
| 50 Cam surface |
| 51 Cam surface |
| 52 Cam follower nose |
| 54 High Energy Lever |
| 56 Flat |
| 58 Hub |
| 60 Pivot Pin |
| 62 Limb |
| 64 Finger |
| 65 Switch Control Lever |
| 66 Hub |
| 67 Pivot Pin |
| 68 Depending leg |
| 69 Depending leg |
| 70 Arm |

-continued

PARTS LIST FOR FIGS. 1–10

72 Leg
74 Upper foot
75 Lower foot
76 Upper hook
78 Lower hook
80 Cam surface

Having thus described my invention, what is claimed is:

1. An auto wind motor control mechanism for a camera comprising:
   a user actuatable shutter release button;
   a lever for actuating a shutter in response to actuation of said shutter release button;
   a control switch which upon closure thereof, activates a film advance motor for advancing film disposed within the camera;
   a cam for opening said switch after the film has advanced a predetermined distance; and
   said switch being actuatable by said lever.

2. The auto wind motor control mechanism of claim 1, wherein said lever sequentially actuates said shutter and said switch.

3. The auto wind motor control mechanism of claim 2, wherein said lever actuates said switch after actuation of said shutter is complete.

4. The auto wind motor control mechanism of claim 3, wherein said lever is actuated by said shutter release button.

5. The auto wind motor control mechanism of claim 4, wherein actuation of said switch is delayed until said shutter release button is released by the user.

6. The auto wind motor control mechanism of claim 1, wherein said shutter release button is user actuatable from a ready position to a release position and said button comprises first and second hooks for sequentially engaging said lever.

7. The auto wind motor control mechanism of claim 6, wherein said lever is sequentially cyclable from an initial, to an intermediate, to a final position and is engageable with said first hook when said lever is disposed in said initial position and said button is disposed in said ready position.

8. The auto wind motor control mechanism of claim 7, wherein said lever is released from said first hook upon movement of said shutter release button from said ready position towards said release position, whereby said shutter is actuated.

9. The auto wind motor control mechanism of claim 8, wherein said lever is engaged by said second hook and disposed in said intermediate position when said button is disposed in said release position after actuation of said shutter.

10. The auto wind motor control mechanism of claim 9, wherein said lever is released from said second hook and is biased to said final position upon release of said button by the user, whereby said switch is closed.

11. The auto wind motor control mechanism of claim 10, further comprising:
   at least one cam member which moves in response to activation of said motor to maintain said switch in a closed position until the film has advanced said predetermined distance;
   an other cam member disposed to move with said at least one cam member to cycle said lever from said final position to said initial position during said activation of said motor;
   said at least one cam member opening said switch after the film has advanced said predetermined distance.

12. An auto wind motor control mechanism comprising:
   a user actuatable shutter release button;
   a control switch, which upon closure thereof, activates a film advance motor;
   a lever being sequentially cyclable from an initial position, to an intermediate position, to a final position, for sequentially actuating a shutter and said control switch in response to movement of said shutter release button;
   at least one cam member which moves in response to activation of said motor to maintain said switch in a closed position until the film has advanced a predetermined distance;
   an other cam member disposed to move with said at least one cam member to cycle said lever from said final position to said initial position during said activation of said motor; and
   said at least one cam member opening said switch after the film has advanced said predetermined distance.

13. A method of operation of an auto wind motor control mechanism for a camera comprising the steps of:
   utilizing a same lever to actuate a shutter and to close a control switch; and
   in response to closing of the control switch, activating a motor for advancing film disposed in said camera.

14. The method of claim 13, further comprising the step of:
   releasing said lever sequentially so that said lever closes said switch after said lever actuates a shutter.

15. The method of claim 14, further comprising the step of:
   utilizing a shutter release button to actuate said lever.

16. The method of claim 15, further comprising the step of:
   mounting hooks on said shutter release button for sequentially engaging and releasing said lever.

17. The method of claim 16, further comprising the step of:
   engaging said lever with said first hook when said button is in a ready position.

18. The method of claim 17, further comprising the step of:
   releasing said lever from said first hook upon movement of said shutter release button from said ready position towards a release position, whereby said shutter is actuated.

19. The method of claim 18, further comprising the step of:
   engaging said lever with said second hook when said button is in the release position after actuation of said shutter.

20. The method of claim 19, further comprising the step of:
   releasing said lever from said second hook upon release of said button by the user, whereby said switch is closed.

21. The method of claim 20, further comprising the step of:
   opening said switch after the film has advanced a predetermined distance.

* * * * *